(12) United States Patent
Mori et al.

(10) Patent No.: US 9,181,972 B2
(45) Date of Patent: Nov. 10, 2015

(54) LOOSENING PREVENTION THREADED FASTENER

(75) Inventors: Shigeto Mori, Hadano (JP); Yousuke Okamura, Hadano (JP); Shunji Tozawa, Hadano (JP)

(73) Assignee: TOPURA CO., LTD., Hadano-shi, Kanagawa (JP)

( * ) Notice: Subject to any disclaimer, the term of this patent is extended or adjusted under 35 U.S.C. 154(b) by 124 days.

(21) Appl. No.: 13/988,407

(22) PCT Filed: Nov. 18, 2011

(86) PCT No.: PCT/JP2011/076706
§ 371 (c)(1),
(2), (4) Date: May 20, 2013

(87) PCT Pub. No.: WO2012/070505
PCT Pub. Date: May 31, 2012

(65) Prior Publication Data
US 2013/0230364 A1    Sep. 5, 2013

(30) Foreign Application Priority Data
Nov. 22, 2010    (JP) .................................. 2010-259730

(51) Int. Cl.
 *F16B 39/30*    (2006.01)
 *F16B 39/282*    (2006.01)

(52) U.S. Cl.
CPC ............... *F16B 39/282* (2013.01); *F16B 39/30* (2013.01)

(58) Field of Classification Search
CPC ...................................... F16B 39/30
USPC ................................. 411/308–310
See application file for complete search history.

(56) References Cited

U.S. PATENT DOCUMENTS

| | | | | |
|---|---|---|---|---|
| RE27,678 E | * | 6/1973 | Orlomoski | 411/311 |
| 3,850,215 A | * | 11/1974 | Orlomoski | 411/311 |
| 3,882,917 A | * | 5/1975 | Orlomoski | 411/309 |

(Continued)

FOREIGN PATENT DOCUMENTS

| | | |
|---|---|---|
| JP | 48-067656 A1 | 9/1973 |
| JP | 50-076264 U | 7/1975 |

(Continued)

OTHER PUBLICATIONS

International Search Report dated Feb. 21, 2012 (with English translation).

*Primary Examiner* — Flemming Saether
(74) *Attorney, Agent, or Firm* — Harness, Dickey & Pierce, P.L.C.

(57) ABSTRACT

A novel loosening prevention threaded fastener in which a clearance side protrusion portion protruding radially outwardly toward a clearance flank surface of a female screw thread is formed on a clearance flank surface of a male screw thread, and the clearance side protrusion portion is constructed such that a tip end portion thereof interferes with the clearance flank surface of the female screw thread, in a state where a pressure flank surface of the male screw thread is in contact with a clearance flank surface of the female screw thread. At the time of screw fastening, the crest end portion of the clearance side protrusion portion is pushed to the pressure flank surface of the female screw thread so that it is deformed in a deflective manner to apply a predetermined contact pressure to a contact surface due to its elastic restoring force, thus providing resistance against a loosening direction.

3 Claims, 3 Drawing Sheets

(56) References Cited

U.S. PATENT DOCUMENTS

| | | | |
|---|---|---|---|
| 3,901,066 A | | 8/1975 | Orlomoski |
| 4,252,168 A | * | 2/1981 | Capuano ............ 411/311 |
| 4,273,175 A | * | 6/1981 | Capuano ............ 411/168 |
| 4,764,067 A | * | 8/1988 | Kawashima ......... 411/310 |
| 6,481,760 B1 | * | 11/2002 | Noel et al. ......... 285/334 |
| 2009/0047093 A1 | * | 2/2009 | Pritchard ............ 411/311 |

FOREIGN PATENT DOCUMENTS

| | | |
|---|---|---|
| JP | 55-155911 A1 | 12/1980 |
| JP | 02-101119 U | 8/1990 |
| JP | 07-139536 A1 | 5/1995 |
| JP | 11-051032 A1 | 2/1999 |
| JP | 2004-190713 A1 | 7/2004 |
| JP | 2006-057801 A1 | 3/2006 |
| WO | 2009/023166 A2 | 2/2009 |

* cited by examiner

LOOSENING PREVENTION THREADED FASTENER

CROSS-REFERENCE TO RELATED APPLICATIONS

This application is a National Stage of International Application No. PCT/JP2011/076706, filed Nov. 18, 2011, which claims priority to Japanese Application No. 2010-259730, filed Nov. 22, 2010. The entire disclosures of each of the above applications are incorporated herein by reference.

FIELD

The present disclosure relates to a loosening prevention threaded fastener provided with an anti-loosening or locking function for a threaded fastening portion.

BACKGROUND

Under the current circumstances, as loosening prevention threaded fasteners to be used for parts in which loosening may occur due to the influence of vibrations or external forces, there have been known one with an adhesive agent coated on a male or external screw thread (refer to a first patent document), and another one which is constructed such that a male screw thread is deformed to generate torque resistance against loosening (refer to a second patent document).

Among these, in the first-mentioned one in which an adhesive agent is coated on a male screw threaded portion, a step for coating the adhesive agent to the screw thread is separately added in a screw thread production process or in a fastening process, and hence, a product cost and a work cost (in the case of coating being carried out before fastening) together with the cost of the adhesive agent itself will rise.

In addition, the adhesive agent includes a resin as a main component, and so, there arises a problem that the fixing or adhesive force is reduced due to the softening of the resin at the time of high temperature, and a certain amount of time is required from the time of fastening to the time at which the adhesive agent solidifies, thereby resulting in a long working time.

Besides, the adhesive agent is coated on a threaded fitting portion, so the coefficient of friction of the threaded portion at the time of fastening changes to a large extent, and it is necessary to adjust the tightening or bolting condition at the time of fastening, and hence, there is a need to carry out special handling which is not required in common threaded fasteners.

Further, at the time of tightening operation, exfoliated or peeled powder of the adhesive agent becomes coarse particulates, powder dust, etc., which fall into surroundings of a working area, thus making it necessary to deal with these particulates or powder dust.

On the other hand, the threaded fastener of the second patent document is constructed such that a slit is formed from a crest of the male screw thread, and a pressure side screw thread half portion is forced into pressure contact with a pressure flank surface of the female screw thread, and at the same time a clearance side screw thread half portion is forced into pressure contact with a clearance flank surface of the female screw thread.

The shaping of such a male screw thread is carried out as follows. First, a thread groove for slitting (hereinafter slit forming thread groove), which is to be made into a slit, and a thread groove for a product (product-use thread groove), which is to be made into a product groove, are formed, and subsequently, plastic deformation is carried out is such a manner that the product-use thread groove is expanded and the slit forming thread groove is narrowed so as to mound an area between adjacent groove portions of the product-use thread groove thereby to form a male screw thread, while leaving a slit in a screw thread crest.

However, the screw thread half portion of the male screw thread has high rigidity, and will deform the pressure flank surface and the clearance flank surface of the female screw thread to a large extent, so that the strength of the threaded fitting portion becomes unable to endure with respect to a tightening force at the time of fastening, and destruction of the fitted screw thread will occur at a low level of axial force or tension. For that reason, there is a problem that it is difficult to obtain high axial tension at the time of tightening, and a slide occurs in a fastening portion between the male screw thread and the female screw thread, at a location to which an external force is applied after tightening.

In addition, the fastening is carried out by causing the pressure flank surface of the screw thread, which becomes a tightening surface, to [[ ]] be deformed to a large extent, and hence, the axial tension generated by the same torque becomes unstable.

Moreover, the female screw thread is plastically deformed at the time of fastening, and hence, when it is repeatedly used, an initial torque resistance against a loosening direction will not be able to be expected, and the male screw will be rotated in a returning direction with a slight torque.

Further, for production, there are required two form rolling dies, i.e., a form rolling die for forming a slit forming thread groove and a product-use thread groove, and another form rolling die for forming a final male screw thread. Even if they are combined or integrated into one or single form rolling die, die portions for respective processes will be required for the single form rolling die, and so, special or exclusive equipment is required, separately from production equipment for ordinary screw threads, thus leading to a cost rise.

On the other hand, in recent years, technological innovation with respect to parts weight saving progresses, and the form of female screws and their construction methods are also changing, and so nuts are not used, but parts to which female screw processing is directly applied to members are increasing in number. For this reason, in many cases, due to the dimensional restrictions of a member in which a female screw is formed, the threads per inch of a female screw cannot be ensured enough, and the threads per inch thereof fitted with a male screw are decreasing in comparison with a nut. In contrast to this, in the conventional parts or fasteners as mentioned above, if the fitting length thereof at the same level of a nut is not secured, it is difficult for parts to exhibit a locking effect, and the fitted threads per inch cannot be ensured enough, so there is a limitation in applying them to female screws.

Further, many of these female screws also have been fabricated by means of rolling processing or component rolling, and a member hole diameter before component rolling will affect a female screw thread inside diameter after the rolling, so that a thread form of an inside diameter portion will be a mountain shape with a depression in its central portion.

In addition, according to the shape of a hole peripheral part before the rolling, variation may occur in the inside diameter, and in such a case, the fitting state of the male screw and the female screw will become still more unstable. With a male screw part or fastener in which an axial force or tension is not stable, as referred to above, a situation will occur where a locking effect cannot be exhibited.

PRIOR ART REFERENCES

Patent Documents

[First Patent Document] Japanese patent application laid-open No. H11-51032
[Second Patent Document] Japanese patent application laid-open No. H7-139536

SUMMARY

Problems to be Solved by the Disclosure

The present disclosure has been made so as to solve the problems of the conventional techniques as referred to above, and has for its object to provide a novel loosening prevention threaded fastener in which loosening of a fastening portion can be prevented in a reliable manner without using an adhesive agent, and besides, joint or fastening strength can be made large, and which can be used in a repeated manner.

Means for Solving the Problems

In order to achieve the above-mentioned object, the present disclosure is characterized by having a construction in which a clearance side protrusion portion protruding toward a clearance flank surface of a mating screw thread to be fastened is formed on a clearance flank surface of a screw thread, and said clearance side protrusion portion is constructed such that a crest end portion thereof interferes with the clearance flank surface of said mating screw thread, in a state where a pressure flank surface of said screw thread is in contact with a pressure flank surface of the mating screw thread; and at the time of screw fastening, the crest end portion of the clearance side protrusion portion is pushed to the clearance flank surface of the mating screw thread so that it is deformed in a deflective manner to apply a predetermined contact pressure to a contact surface due to its elastic restoring force, thus providing resistance against a loosening direction.

The loosening prevention threaded fastener of the present disclosure can be constructed as follows.

A pressure side crest of the screw thread at the side of the pressure flank surface is lower than a crest of the clearance side protrusion portion, and is formed into [[ ]] an underfill portion which is notched or cut away from a crest of the pressure flank surface of said screw thread to a root of the clearance side protrusion portion thereof.

In addition, it is preferable that the clearance side protrusion portion be constructed such that its thickness gradually increases from its crest end portion toward its root portion.

Moreover, it is preferable that the clearance side protrusion portion be formed over an entire length of a male screw thread except for imperfect screw thread portions at opposite ends thereof.

Here, note that this screw thread can be applied to both a male screw thread and a female screw thread.

Effect of the Disclosure

According to the present disclosure, even in cases where an axial force or tension is reduced by the action of an external force, contact pressure is maintained by an elastic restoring force of a clearance side protrusion portion of a screw thread, so that, by its friction torque, loosening of the screw thread can be prevented in a reliable manner.

In addition, at the time of tightening, the clearance side protrusion portion is placed in contact with a clearance flank surface of a mating screw thread, but an amount of elastic deformation of the clearance side protrusion portion only becomes an increment of tightening torque, and the resistance at the time of tightening is small.

Moreover, on the pressure flank surface, there are no irregularities in particular that make partial contact, and a tightening load is dispersed over an entire contact surface of the pressure flank surface, so that a large axial force or tension can be obtained.

Further, the pressure flank surface and the clearance flank surface of the mating screw thread do not in particular cause plastic deformation, and hence, even in the case of repeated use, a stable tightening load can be obtained and in addition, a stable resistance torque with respect to loosening accompanied by a rotation in a returning direction can be obtained.

Furthermore, because the clearance side protrusion portion is only formed on the clearance flank surface side of the screw thread, in the case of a male screw, it is not necessary to form a slit as conventionally required, and it can be produced with the use of a single form rolling die, only by deforming an ordinary screw thread, so it can be formed only by changing a rolling die in existing equipment.

DRAWINGS

DETAILED DESCRIPTION

In the following, modes for carrying out the present disclosure will be described in detail based on preferred embodiments thereof as illustrated.

Figure 1A:
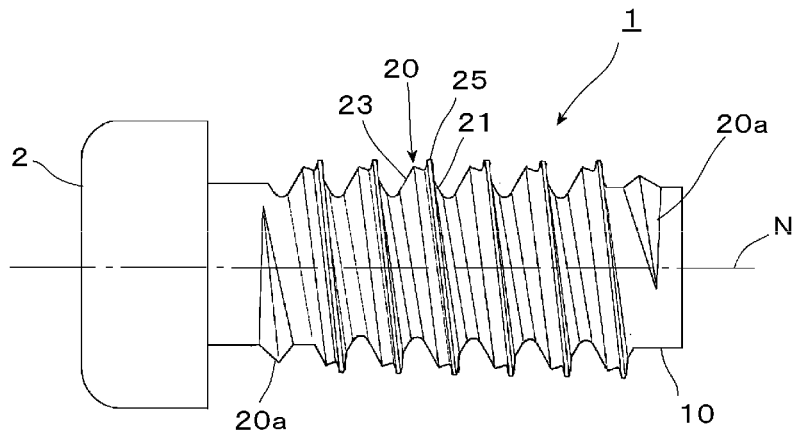
FIG. 1A is a general or overall view showing an example of a loosening prevention threaded fastener.
Figure 1B:
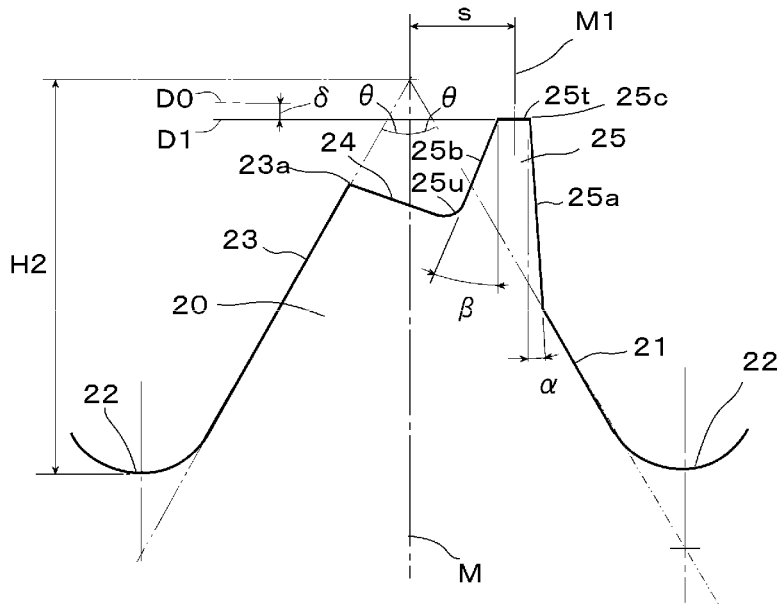
FIG. 1B is an enlarged view showing the shape of a male screw thread in FIG. 1A.

FIGS. 1A and 1B show a loosening prevention threaded fastener according to an embodiment of the present disclosure. In these Figures, 1 denotes the loosening prevention threaded fastener, and this loosening prevention threaded fastener 1 is a male screw, which is provided with a male screw thread 20 spirally formed on an outer periphery of a screw shank 10. A clearance side protrusion portion 25 protruding in a diametrically outward direction is formed on a clearance flank surface 21 of this male screw thread 20.

In an illustrated example, this male screw thread 20 is a triangular screw thread, and as shown in FIG. 1A, the clearance flank surface 21 and a pressure flank surface 23 thereof are symmetrically inclined by a predetermined angle θ with respect to a screw thread centerline M (refer to FIG. 1B) which is orthogonal to a central axis N of the screw shank 10. In this example, the male screw thread 20 is basically a metric thread of JIS (Japanese Industrial Standard), and has an angle of gradient θ of 30 degrees.

With respect to the male screw thread 20, the clearance side protrusion portion 25 makes the shape of the clearance flank surface 21 and the pressure flank surface 23 into an asymmetric mountain shape with respect to the screw thread centerline M, while making the shape of the screw thread into a uniform shape, except for incomplete threads 20a, 20a at screw opposite end portions.

A pressure side crest 23a of the pressure flank surface 23 of the male screw thread 20 is lower than a crest 25t of the clearance side protrusion portion 25, and is notched or cut away from the pressure side crest 23a of the pressure flank surface 23 of the male screw thread 20 to a root of the clearance side protrusion portion 25, thereby forming an underfill portion 24.

Accordingly, the crest 25t of the clearance side protrusion portion 25 is the highest crest of the male screw thread 20, and becomes a summit or crest of the male screw thread 20.

In this example, the pressure flank surface 23 has the same shape as a standard thread shape, up to a range of 0.5-0.8×H2, with respect to a height of fundamental triangle (H2) from a thread bottom of a thread trough portion 22, and from this range to the crest of the screw thread, it is formed into the underfill portion 24 which extends to the root of the clearance side protrusion portion 25 in a direction toward the screw thread centerline M. The fundamental triangle has a triangular mountain shape which is drawn by an extension line of the clearance flank surface 21 and an extension line of the pressure flank surface 23.

The clearance flank surface 21 has the same shape as that of an ordinary JIS metric screw thread, up to a range of 0.2-0.6× H2, with respect to the height of fundamental triangle (H2) from the thread bottom of the thread trough portion 22, and from this range to the screw thread crest, it is formed into the clearance side protrusion portion 25.

A clearance flank surface 25a of this clearance side protrusion portion 25 extends linearly to reach the crest 25t, and has an angle α (frank angle) with respect to the screw thread centerline M, which is an angle smaller than the angle θ of the clearance flank surface 21, i.e., an angle smaller than a half angle of 30 degrees of the JIS metric screw thread in this example. This angle α includes 0 degree.

The crest 25t of the clearance side protrusion portion 25 of the clearance flank surface 21 is constructed to extend spirally along a cylindrical surface which extends linearly in a direction orthogonal with respect to the screw thread centerline M, and has a predetermined width in an m dimension (i.e., the length of the crest 25t in the direction of the central axis N of the screw shank 10). In this example, in the case of a metric thread of M6, the m dimension of the clearance side protrusion portion 25 is a dimension of 0.05-0.2 mm. A centerline M1 of the clearance side protrusion portion 25, which is located in the middle point of this m dimension and is drawn in parallel with the screw thread centerline M of the male screw thread 20, is located in a position shifted by a predetermined amount s from the screw thread centerline M to the side of the clearance flank surface 21. The screw thread centerline M is a centerline of the JIS metric screw thread shape which is formed from the screw thread trough portion 22 to a location at which the thread shape changes.

When the pitch of the male screw thread 20 is set to P, it is preferable that this amount of position shift s be at a maximum of P/4 or less. When the amount of position shift s is made larger than this maximum, an interference between the clearance side protrusion portion 25 and the female screw thread becomes too much. On the other hand, when the amount of position shift s is smaller than this maximum, an interference between the clearance side protrusion portion 25 and the female screw thread becomes not enough.

The shape from the crest 25t of the clearance side protrusion portion 25, which is the crest of the clearance flank surface 21, to the pressure flank surface 23 is a shape having an opposite clearance flank surface 25b of the clearance side protrusion portion 25, and the underfill portion 24 extending from the crest portion 23a of the pressure flank surface 23. The opposite clearance flank surface 25b of the clearance side protrusion portion 25 extends from the crest 25t toward the root side (bottom side) linearly in an inclined manner in a direction gradually away from the centerline M1, and comes in contact with a line segment which forms the underfill portion 24 extending from the crest portion 23a of the pressure flank surface 23 toward the clearance flank surface 21, thereby forming an irregular screw thread shape.

This opposite clearance flank surface 25b extends at an angle β of 30 to 60 degrees with respect to the screw thread centerline M, and is in contact with a line segment which forms the underfill portion 24 extending from the crest portion 23a of the pressure flank surface 23 toward the clearance side protrusion portion 25.

Accordingly, the clearance side protrusion portion 25 takes a lip-shaped or blade-shaped protrusion form which is formed by the clearance flank surface 25a and the opposite clearance flank surface 25b, with its thickness becoming gradually larger in a direction from the crest 25t, which is a crest end portion, toward the root portion.

On the other hand, the underfill portion 24 forms a step with a height of the clearance side protrusion portion 25, when seen from the side of the crest 25t of the clearance side protrusion portion 25, and a corner angle portion 25u, at which the opposite clearance flank surface 25b of the clearance side protrusion portion 25 is in contact with the underfill portion 24, is a little lower than the crest 23a of the pressure flank surface 23, so that the underfill portion 24 forms an inclined surface which is inclined linearly toward the clearance side protrusion portion 25. Thus, when it is constructed such that the underfill portion is inclined toward the corner angle portion 25u of the clearance side protrusion portion 25, the thickness of a screw material can be sufficiently turned to the clearance side protrusion portion 25 at the time of rolling, while taking a sufficient contact width of the pressure flank surface 23. In addition, it can be constructed such that an amount of protrusion of the clearance side protrusion portion 25 is made as large as possible so as to be easy to bend or flex.

Moreover, a male screw outside diameter D1, which is formed by the crest 25t of the clearance side protrusion portion 25, is set within a range which does not exceed an outside diameter maximum value (basic size or dimension) of a metric thread 4h (old class 1). In FIGS. 1A and 1B, when the outside diameter maximum value of the metric thread is set to D0, the male screw outside diameter D1 is smaller by δ (including 0) than D0.

Figure 2A:
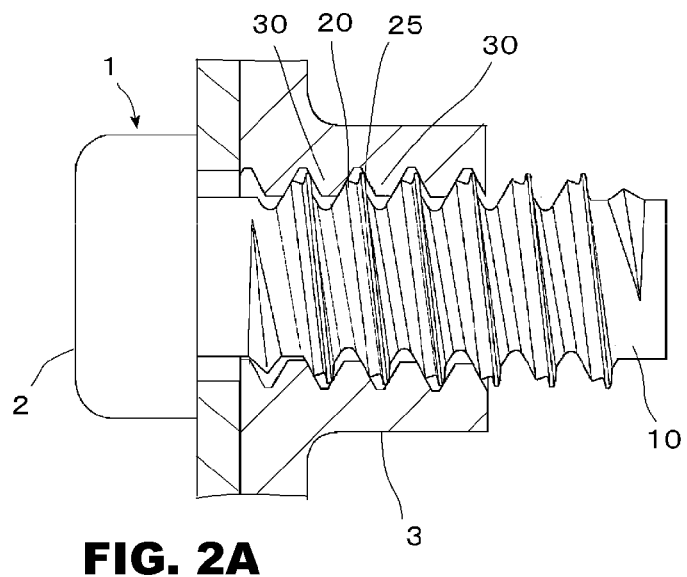
FIG. 2A is a view showing an example of a fastening state of the loosening prevention threaded fastener in FIG. 1A and FIG. 1B.
Figure 2B:
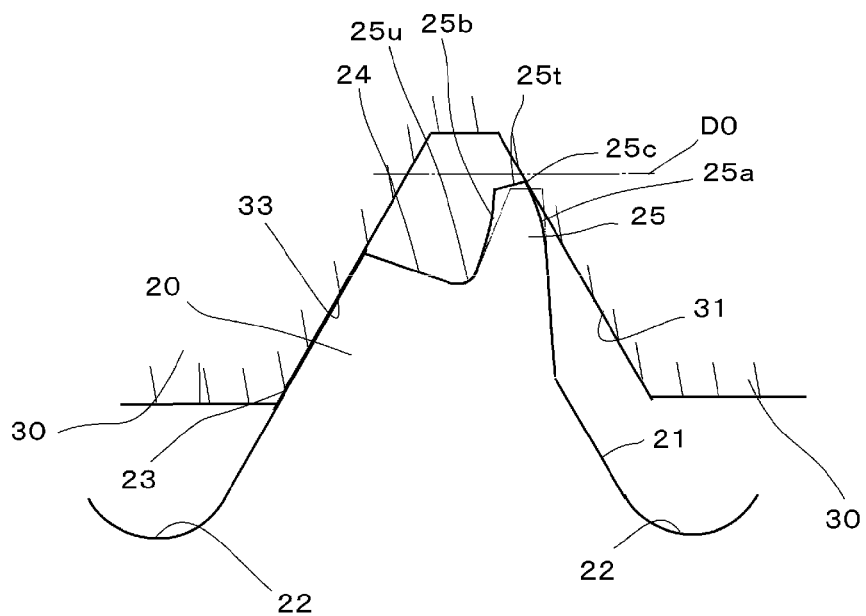
FIG. 2B is a view showing a threaded fitting portion of the male screw thread and a female screw thread in FIG. 2A.

FIGS. 2A and 2B are views showing examples of a threaded fastening portion of a loosening prevention male threaded fastener of FIGS. 1A and 1B.

A clearance side protrusion portion 25 of the loosening prevention male threaded fastener 1 has a construction in which a crest end portion 25 thereof interferes with a clearance flank surface 31 of a female screw thread 30, in a state where a pressure flank surface 23 of a male screw thread 20 is in contact with a pressure flank surface 33 of the female screw thread 30, at the time of screw fastening, wherein the construction is such that the crest end portion 25 is pushed to the clearance flank surface 31 of the female screw thread 30 so that it is deformed in a deflective manner to apply a predetermined contact pressure to a contact surface due to its elastic restoring force, thus providing resistance against a loosening direction.

The female screw thread 30 is also a metric thread, as in the male screw thread side, and an angle between the clearance flank surface 31 and the pressure flank surface 33 is the same as that between the clearance flank surface 21 and the pressure flank surface 23 of the male screw thread 20.

According to the present disclosure, even in cases where an axial force or tension is reduced, friction torque, which becomes resistance against the loosening direction, acts due to the elastic restoring force of the clearance side protrusion portion 25, so that loosening of the screw threads can be prevented.

That is, a vicinity of the crest end portion of the clearance side protrusion portion 25, which constitutes an asymmetric mountain-shaped crest portion formed on the clearance flank surface 21 of the male screw, is in contact with the clearance flank surface 31 at the female screw side, while being elastically deformed due to its interfere with the clearance flank surface 31, whereby proper prevailing torque is caused to occur at the time of rotation in a screw loosening direction, thus preventing screw loosening.

That is, the crest end portion of the clearance side protrusion portion 25, which is in contact with the clearance flank surface 31 at the female screw side, is deformed in a deflective manner by an amount of interference between a corner portion 25c of the crest 25t of the clearance side protrusion portion 25 and the clearance flank surface 21, and the clearance flank surface 31 of the female screw thread 30, so that contact is made in a predetermined region from the corner portion 25c to the clearance flank surface 31.

In this embodiment, it is constructed such that the thickness of the clearance side protrusion portion 25 becomes larger gradually in a direction from the crest 25t toward the root thereof, so that the deformation is supported by the root side, and the crest end portion bends to a large extent, thus providing a proper elastic restoring force. In addition, the root side is thick, so the stress applied to the root portion can be reduced.

Moreover, the clearance side protrusion portion 25 is formed over an entire length of the male screw thread 20 except for imperfect screw thread portions 20a at opposite ends thereof, as a result of which at the time of tightening the screw, the clearance side protrusion portion 25 is continuously deformed, from a stage in which the clearance side protrusion portion 25 starts to engage with a threaded hole, so that it is threadedly fitted into the threaded hole in a smooth manner.

In addition, a portion in which the male screw thread 20 is elastically deformed to provide contact resistance against the female screw thread 30 is the clearance flank surface 31 of the female screw thread 30, and so, the male screw thread 20 is in contact with the clearance flank surface 31 without interfering with a bottom portion of the female screw thread. As a result, prevailing torque does not become very high, and is stable at a suitable value.

In particular, because the diameter D1 of the crest 25t of the clearance side protrusion portion 25 is made smaller than the outside diameter maximum value D0 of the metric thread, a position of contact of the female screw thread 30 with the clearance flank surface 31 is also located at the thread bottom side rather than a maximum value of the female screw thread inside diameter, the prevailing torque does not vary even due to a variation in the female screw thread inside diameter, and a stable value of the prevailing torque is obtained.

Further, the opposite clearance flank surface 25b of the clearance side protrusion portion 25 is notched or cut away from the crest 23a of the pressure flank surface 23 to the root of the clearance side protrusion portion 25 thereby to form the underfill portion 24, so that deformation of the clearance side protrusion portion 25 cannot be obstructed.

Moreover, at the time of screw tightening, the clearance side protrusion portion 25 of the male screw thread 20 is placed in contact with the clearance flank surface 31 of the female screw thread 30, but an amount of elastic deformation of the clearance side protrusion portion 25 only becomes an increment of tightening torque, and the resistance at the time of tightening is small.

The pressure flank surface 23 of the male screw thread 20 does not, in particular, have irregularities that cause partial contact, and is not at all different from ordinary screw thread fastening, making it possible to obtain a stable high axial force or tension. In particular, in this embodiment, the structure of the pressure flank surface 23 is the same as that of an ordinary JIS metric screw thread, and hence, the state of contact thereof with the flank surface of the female screw thread has no difference with the ordinary screw thread, and fastening characteristics at the time of first use and at the time of repeated use are also very stable.

Further, the clearance flank surface 31 of the female screw thread 30 is not particularly subjected to plastic deformation, and hence, in the case of repeated use, too, it is possible to obtain stable torque resistance to the loosening direction.

Furthermore, as described above, the crest end portion of the clearance side protrusion portion 25 at the side of the crest 25t thereof is pushed to the clearance flank surface 31 of the female screw thread 30, and is thereby deformed in a deflective manner, so that prevailing torque is generated by contact resistance due to the elastic restoring force of the crest end portion thus deformed. As a result, in repeated use, too, a prevailing torque value substantially equal to that at the time of the first use is obtained.

In addition, the female screw thread of the mating material is not subjected to large plastic deformation, so the strength of the screw thread fitting portion is also high. As a consequence, an allowable limit of the fastening force is also high, and it is possible to ensure proper fitting strength with respect to a female screw which has a small number of fitting threads per inch.

The prevailing torque, which is generated by the metal-to-metal contact of the screw threads, is also excellent in its characteristic at the time of high temperature, as compared with prevailing torque which is obtained by the adhesion effect of a resin type adhesive agent.

In addition, with a loosening prevention bolt in which its screw thread is locally or partially crushed, as in a conventional case, the structure of a form rolling tool becomes complicated, and besides, a crushed screw thread portion of the bolt also becomes local, so it is necessary to form the screw thread crushed portion according to a fitting position thereof with a female screw, and it is also necessary to set the screw thread crushed portion at each application part or location. In the present disclosure, however, the structure of the form rolling tool, such as a form rolling die, also has no difference with a general bolt tool, and has a uniform mountain or triangular shape over the entire length of the threaded portion, so that there are no restrictions on the female screw thread position in an application part or location.

Although in the above-mentioned embodiment, reference has been made to the male screw threaded fastener, the present disclosure can also be applied to a female screw thread of a female screw threaded fastener in a similar manner.

Figure 3:
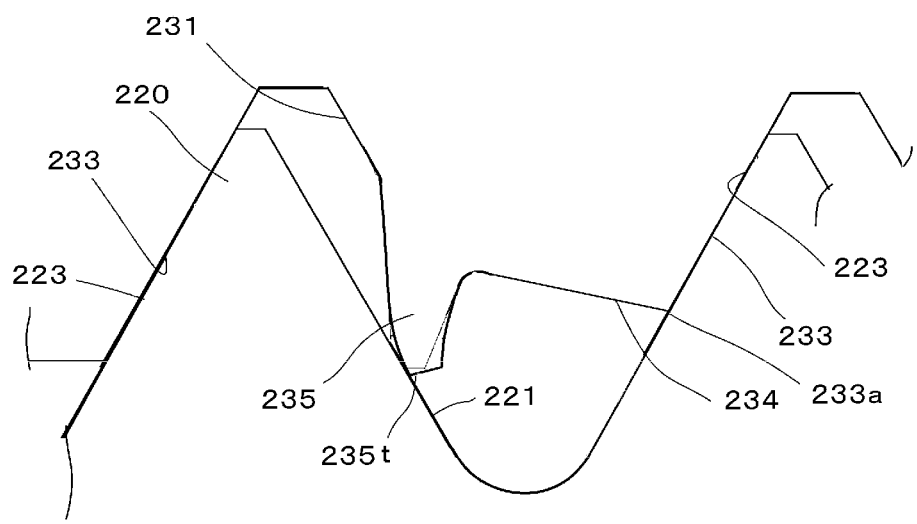
FIG. 3 is a view showing a threaded fitting portion of a male screw thread of a loosening prevention threaded fastener in which the present disclosure is applied to a female screw thread.

In FIG. 3, there is schematically shown a fastening portion of a loosening prevention threaded fastener which is applied to a female screw.

That is, a clearance side protrusion portion 235 protruding radially inwardly toward a clearance flank surface 221 of a male screw thread 220, which acts as a mating screw thread to be fastened, is formed on a clearance flank surface 231 of a female screw thread 230.

The clearance side protrusion portion 235 has a construction in which a crest end portion thereof interferes with the clearance flank surface 221 of the mating male screw thread 220, in a state where a pressure flank surface 233 of the female screw thread 230 is in contact with a pressure flank surface 223 of the mating male screw thread 220, wherein the construction is such that at the time of screw fastening, the crest end portion of the clearance side protrusion portion 235 is pushed to the clearance flank surface 221 of the mating male screw thread 220, so that it is deformed in a deflective manner to apply a predetermined contact pressure to a contact surface due to its elastic restoring force, thus providing resistance against a loosening direction.

A pressure side crest 233a at the side of the pressure flank surface 233 of the female screw thread 230 is lower than a crest 235t of the clearance side protrusion portion 235, and is notched or cut away from the crest 233a of the pressure flank surface 233 of the female screw thread 230 to a root of the clearance side protrusion portion 235, thereby forming an underfill portion 234.

Here, note that the present disclosure is not limited to the above-mentioned embodiments, but the clearance side protrusion portion may be used as a tightening surface, and various kinds of shapes and structures can be selected within a scope which does not depart from the gist of the present disclosure.

EXPLANATION OF REFERENCE NUMERALS AND CHARACTERS 1 loosening prevention screw
2 head
10 screw shank
20 male screw thread
21 clearance flank surface
23 pressure flank surface
25 clearance side protrusion portion
30 female screw thread
31 clearance flank surface
33 pressure flank surface

The invention claimed is:

1. A loosening prevention threaded fastener fastened to a mating threaded fastener, comprising:
   a clearance side protrusion portion protruding toward a clearance flank surface of a mating screw thread of the mating threaded fastener is formed on a clearance flank surface of a screw thread, and said clearance side protrusion portion has a construction in which a crest end portion thereof interferes with the clearance flank surface of said mating screw thread in a state where a pressure flank surface of said screw thread is in contact with a pressure flank surface of the mating screw thread;
   at the time of screw fastening, the crest end portion of the clearance side protrusion portion is adapted to be pushed by the clearance flank surface of the mating screw thread so that it is deformed in a deflective manner to apply a predetermined contact pressure to a contact surface due to its elastic restoring force, thus providing resistance against a loosening direction;
   a pressure side crest of the screw thread at the side of the pressure flank surface is lower relative to a center of the threaded fastener than the crest end portion of the clearance side protrusion portion, and is formed into an under fill portion which is notched from a crest of the pressure flank surface of said screw thread to a root of the clearance side protrusion portion thereof;
   the clearance side protrusion portion gradually increases in thickness from its crest end portion toward its root and takes a lip-shaped protrusion form;
   a clearance flank surface of the clearance side protrusion portion extends linearly toward the crest, and has an angle with respect to a plane orthogonal to the screw thread centerline, which is an angle smaller than the angle of the clearance flank surface of the mating screw thread;
   the crest of the clearance side protrusion portion is constructed to extend spirally along a cylindrical surface which extends linearly in a direction parallel with respect to the screw thread centerline, and has a predetermined width; and
   in a threaded condition the crest end portion of the clearance side protrusion portion, which is in contact with the clearance flank surface at the mating screw thread, is adapted to be deformed in a deflective manner by an amount of interference between a corner portion of the crest and the clearance flank surface of the clearance side protrusion portion, and the clearance flank surface of the mating screw thread, so that contact is made in a predetermined region from the corner portion to the clearance flank surface.

2. The loosening prevention threaded fastener fastened to a mating threaded fastener as set forth in claim 1, wherein the clearance side protrusion portion is formed over an entire length of the male screw thread except for imperfect screw thread portions at opposite ends thereof.

3. The loosening prevention threaded fastener fastened to a mating threaded fastener as set forth in claim 1, wherein the pressure flank surface has the same shape as a standard thread shape, up to a range of 0.5-0.8×H2, with respect to a height of funtamental triangle (H2) from a thread bottom of a thread trough portion, and a corner angle portion, at which the opposite clearance flank surface of the clearance side protrusion portion is in contact with the underfill portion, is lower than the crest of the pressure flank surface, so that the underfill portion forms an inclined surface which is inclined linearly toward the clearance side protrusion portion.

* * * * *